(12) United States Patent
Deng et al.

(10) Patent No.: US 9,301,190 B2
(45) Date of Patent: *Mar. 29, 2016

(54) METHOD, APPARATUS, AND SYSTEM FOR MEASURING AGGREGATED CARRIER CELL

(71) Applicant: HUAWEI TECHNOLOGIES CO., LTD., Shenzhen (CN)

(72) Inventors: Tianle Deng, Shanghai (CN); Binsong Tang, Shanghai (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/663,857

(22) Filed: Mar. 20, 2015

(65) Prior Publication Data

US 2015/0195735 A1    Jul. 9, 2015

Related U.S. Application Data

(63) Continuation of application No. 14/284,705, filed on May 22, 2014, now Pat. No. 9,020,494, which is a continuation of application No. 13/565,052, filed on Aug. 2, 2012, now Pat. No. 8,774,792, which is a continuation of application No. PCT/CN2011/070682, filed on Jan. 27, 2011.

(30) Foreign Application Priority Data

Feb. 3, 2010  (CN) .......................... 2010 1 0107381

(51) Int. Cl.
*H04W 4/00* (2009.01)
*H04W 24/10* (2009.01)
(Continued)

(52) U.S. Cl.
CPC ............... *H04W 24/10* (2013.01); *H04L 5/001* (2013.01); *H04L 43/08* (2013.01); *H04W 52/0245* (2013.01); *H04B 17/318* (2015.01); *H04W 72/08* (2013.01)

(58) Field of Classification Search
CPC .............................. H04W 24/10; H04L 43/08
USPC ........................................ 455/422.1; 370/338
See application file for complete search history.

(56) References Cited

U.S. PATENT DOCUMENTS 6,295,279 B1    9/2001   Lin
6,349,094 B1    2/2002   Vastano et al.
(Continued)

FOREIGN PATENT DOCUMENTS

CN       1321366      11/2001
CN      101159953      4/2008
(Continued)

OTHER PUBLICATIONS

Qualcomm Incorporated: *Considerations on Carrier Activation*, 3GPP TSG RAN WG2 #68bis, R2-10024, Jan. 18-22, 2010, Valencia, Spain (2 pp.).
(Continued)

*Primary Examiner* — Marcos Batista
(74) *Attorney, Agent, or Firm* — Staas & Halsey LLP (57) ABSTRACT

A disclosure for measuring an aggregated carrier cell measuring an aggregated carrier cell configured with multiple component carriers is provided. In the disclosure, a user equipment receives, from a base station, a measurement period parameter for measuring a component carrier. The user equipment calculate a measurement period for a non-active component according to the received measurement period parameter and a signal measurement estimation value of the non-active component carrier, and performs measurement on the non-active component carrier with the calculated measurement period for the non-active component.

20 Claims, 6 Drawing Sheets

(51) Int. Cl.
| | |
|---|---|
| *H04L 5/00* | (2006.01) |
| *H04W 52/02* | (2009.01) |
| *H04L 12/26* | (2006.01) |
| *H04W 72/08* | (2009.01) |
| *H04B 17/318* | (2015.01) |

(56) References Cited

U.S. PATENT DOCUMENTS

| | | | |
|---|---|---|---|
| 6,463,105 | B1 | 10/2002 | Ramesh |
| 7,190,979 | B1 | 3/2007 | Marshall et al. |
| 2005/0181733 | A1 | 8/2005 | Zangi et al. |
| 2006/0274712 | A1 | 12/2006 | Malladi et al. |
| 2009/0042593 | A1 | 2/2009 | Yavuz et al. |
| 2010/0020852 | A1 | 1/2010 | Erell et al. |
| 2010/0130218 | A1 | 5/2010 | Zhang et al. |
| 2010/0190488 | A1 | 7/2010 | Jung et al. |
| 2010/0296410 | A1 | 11/2010 | Kazmi |
| 2011/0038271 | A1 | 2/2011 | Shin et al. |
| 2011/0142009 | A1 | 6/2011 | Lindoff et al. |
| 2012/0295610 | A1 | 11/2012 | Deng et al. |

FOREIGN PATENT DOCUMENTS

| | | |
|---|---|---|
| CN | 101420723 | 4/2009 |
| CN | 101505498 | 8/2009 |
| CN | 101541029 | 9/2009 |
| CN | 101594683 | 12/2009 |
| EP | 1161107 | 12/2001 |
| WO | 2004-004173 | 1/2004 |
| WO | WO/2007/066949 A2 | 6/2007 |
| WO | 2009-019062 | 2/2009 |

OTHER PUBLICATIONS

Non-Final Office Action dated Nov. 29, 2012 in parent U.S. Appl. No. 13/565,052 (17 pages).
Notice of Allowance mailed Feb. 25, 2014 in parent U.S. Appl. No. 13/565,052 (10 pages).
3GPP TS 36.300 V9.2:0 (Dec. 2009); "*3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)*"; pp. 1-178.
Final Office Action dated May 7, 2015 in related U.S. Appl. No. 13/687,501 (27 pages).
Non-Final Office Action dated Nov. 5, 2015 in related U.S. Appl. No. 13/687,501 (27 pages).
3GPP TS 36.331 V9.1.0, "3rd Generation Partnership Project; Technical Specification Group Radio Access Network; Evolved Universal Terrestrial Radio Access (E-UTRA) Radio Resource Control (RRC); Protocol specification (Release 9)", Dec. 2009, pp. 1-233.
International Search Report issued May 5, 2011 in corresponding International Patent Application No. PCT/CN2011/070682 (4 pp.).
Written Opinion of the International Searching Authority issued May 5, 2011 in corresponding International Patent Application No. PCT/CN2011/070682.
Panasonic: *Need for separate component carrier activation step*, 3GPP TSG-RAN WG2 Meeting #68bis, R2-100233, Jan. 18-22, 2010, Valencia, Spain (3 pp.).
Qualcomm Incorporated: *Considerations on Carrier Activation*, 3GPP TSG RAN WG2 #68bis, R2-100424, Jan. 18-22, 2010, Valencia, Spain (2 pp.).
Extended European Search Report, dated Jan. 25, 2013, in corresponding European Application No. 11739382.7 (8 pp.).
Search Report, dated Jan. 24, 2013, in corresponding Chinese Application No. 2010101073815 (2 pp.).
Non-Final Office Action dated Nov. 29, 2012 in parent U.S. Appl, No. 13/565,052 (17 pages).
Final Office Action dated Oct. 3, 2013 in parent U.S. Appl. No. 13/565,052 (15 pages).
Notice of Allowance mailed Feb. 25, 2014 in parent U.S. Appl. No. 13/565,052 (10 pages.).
Office Action dated Mar. 15, 2013 in related U.S. Appl. No. 13/687,501 (20 pp.).
Final Office Action mailed Oct. 23, 2013 in related U.S. Appl. No. 13/687,501 (25 pp.).
Notice of Allowance mailed Dec. 11, 2014 in parent U.S. Appl. No. 14/284,705 (10 pages).
Non-Final Office Action dated Aug. 6, 2014 in parent U.S. Appl. No. 14/284,705 (15 pages).
U.S. Appl. No. 14/284,705, filed May 22, 2014, Deng et al., Huawei Technologies Co., Ltd. Shenzhen, P.R. China.
U.S. Appl. No. 13/565,052, filed Aug. 2, 2012, Deng et al., Huawei Technologies Co., Ltd. Shenzhen, P.R. China.
U.S. Appl. No. 13/687,501, filed Nov. 28, 2012, Deng et al., Huawei Technologies Co., Ltd. Shenzhen, P.R. China.

```
┌─────────────────────────────────────────────────────────┐
│ A UE receives measurement configuration information     │
│ sent from an eNB or the UE obtains measurement          │
│ configuration information from preset information,      │ 701
│ where the measurement configuration information         │
│ includes an RSRP value and a corresponding              │
│ measurement period thereof, and further includes type   │
│ information or power information of an aggregated       │
│ carrier cell, or further includes speed information     │
└─────────────────────────────────────────────────────────┘
                           ↓
┌─────────────────────────────────────────────────────────┐
│ The UE receives type information or power information   │
│ of the aggregated carrier cell sent from a serving      │ 702
│ base station, or selects a corresponding RSRP value     │
│ and a measurement period corresponding to the RSRP      │
│ value according to the current speed of the UE          │
└─────────────────────────────────────────────────────────┘
                           ↓
┌─────────────────────────────────────────────────────────┐
│ The UE receives measurement period calculation          │ 703
│ information sent from the eNB                           │
└─────────────────────────────────────────────────────────┘
                           ↓
┌─────────────────────────────────────────────────────────┐
│ The UE calculates the measurement periods of non-active │
│ component carriers according to the RSRP of the         │ 704
│ non-active component carriers CC1 and CC2 in the        │
│ aggregated carrier cell, the selected RSRP value and    │
│ the corresponding measurement period thereof, and the   │
│ measurement period calculation information              │
└─────────────────────────────────────────────────────────┘
                           ↓
┌─────────────────────────────────────────────────────────┐
│ The UE measures CC1 and CC2 according to the            │ 705
│ calculated measurement periods                          │
└─────────────────────────────────────────────────────────┘
```

METHOD, APPARATUS, AND SYSTEM FOR MEASURING AGGREGATED CARRIER CELL

CROSS-REFERENCE TO RELATED APPLICATIONS

This application is a continuation of U.S. patent application Ser. No. 14/284,705, filed on May 22, 2014, which is a continuation of U.S. patent application Ser. No. 13/565,052, filed on Aug. 2, 2012, which is a continuation of International Application No. PCT/CN2011/070682, filed on Jan. 27, 2011, which claims priority to Chinese Patent Application No. 201010107381.5, filed on Feb. 3, 2010, all of which are hereby incorporated by reference in their entireties.

FIELD OF THE INVENTION

The present invention relates to the field of mobile communications, and in particular, to a technical solution of measuring an aggregated carrier cell.

BACKGROUND OF THE INVENTION

In a wireless cellular communication system, a user equipment (User Equipment, UE) in the active (Active) state determines a serving cell according to signal power of a cell, while a UE in the idle (Idle) state determines a camping cell according to the signal power of the cell. Therefore, the UE needs to measure signals of the serving cell or the camping cell and signals of neighboring cells.

In a single carrier cell system, one cell has one carrier, and the UE only needs to measure signals on a sole carrier in the serving cell or the camping cell.

With the development of communications technologies, the concept of an aggregated carrier is proposed in a long term evolution advanced (Long Term Evolution advanced, LTE-Advanced) system, that is, multiple carriers are aggregated into a cell and the cell is called aggregated carrier cell and provides the UE with a higher speed of service data. A base station may, according to the capability of the UE and a service type, dynamically schedule each component carrier (Component Carrier, CC), and increase or reduce the number of component carriers used by the UE.

For the aggregated carrier cell, a cell has more than one carrier, and each carrier cannot be measured by using the method in the prior art for measuring a single carrier cell. Therefore, how to measure component carriers in the aggregated carrier cell is an urgent problem to be solved.

SUMMARY OF THE INVENTION

In one respect, the present invention provides a method for measuring an aggregated carrier cell, which includes: obtaining, by a user equipment, measurement configuration information of an aggregated carrier cell, where the measurement configuration information includes signal estimation value information and a corresponding measurement period thereof; obtaining, by the user equipment, a measurement period of a non-active component carrier according to a signal estimation value of the non-active component carrier in the aggregated carrier cell and the measurement configuration information; and measuring, by the user equipment, the non-active component carrier according to the measurement period of the non-active component carrier.

In another respect, the present invention provides a user equipment, which includes: a first obtaining unit, configured to obtain measurement configuration information of an aggregated carrier cell, where the measurement configuration information includes signal estimation value information and a corresponding measurement period thereof; a second obtaining unit, configured to obtain a measurement period of a non-active component carrier according to a signal estimation value of the non-active component carrier in the aggregated carrier cell and the measurement configuration information; and a measuring unit, configured to measure the non-active component carrier according to the measurement period of the non-active component carrier.

In still another respect, the present invention provides a system for measuring an aggregated carrier cell, which includes a base station and the user equipment.

By using the above technical solution, the user equipment can measure different component carriers in an aggregated carrier cell in different periods, which avoids power consumption due to excessive measurements.

BRIEF DESCRIPTION OF THE DRAWINGS

To make the technical solution of the present invention clearer, the following briefly describes the accompanying drawings used in the description of embodiments. Evidently, the accompanying drawings are exemplary only, and those skilled in the art may derive other drawings from such accompanying drawings without any creative effort.

FIG. 6-*a* is a schematic diagram of a linear relationship in a method for measuring an aggregated carrier cell according to another embodiment of the present invention;

FIG. 6-*b* is a schematic diagram of a non-linear relationship in a method for measuring an aggregated carrier cell according to another embodiment of the present invention;

DETAILED DESCRIPTION OF THE INVENTION

The following describes embodiments of the present invention in detail with reference to the accompanying drawings.

Figure 1:
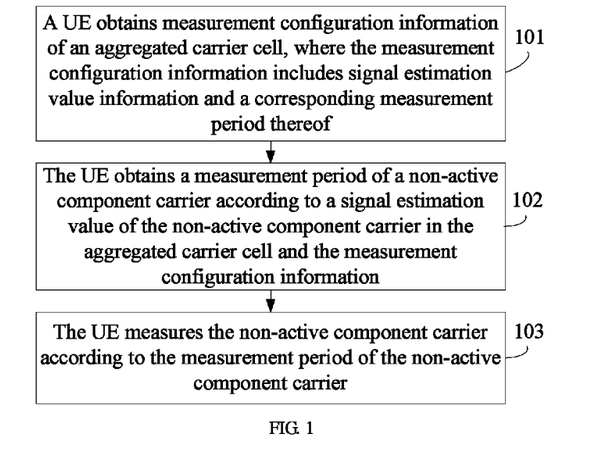
FIG. 1 is a schematic diagram of a method for measuring an aggregated carrier cell according to an embodiment of the present invention.

An embodiment of the present invention provides a method for measuring an aggregated carrier cell. As shown in FIG. 1, the method includes the following steps:

101: A UE obtains measurement configuration information of an aggregated carrier cell, where the measurement configuration information includes signal estimation value information and a corresponding measurement period thereof.

102: The UE selects a measurement period of a non-active component carrier according to a signal estimation value of the non-active component carrier in the aggregated carrier cell and the measurement configuration information.

103: The UE measures the non-active component carrier according to the measurement period of the non-active component carrier.

By using the method for measuring an aggregated carrier cell provided in this embodiment, the UE measures different component carriers in the aggregated carrier cell in different periods, which avoids power consumption due to excessive measurements.

In a specific implementation process, in step 101, the obtaining, by the UE, the measurement configuration information of the aggregated carrier cell may include: receiving, by the UE, the measurement configuration information sent from a serving base station, or obtaining, by the UE, the measurement configuration information from preset information.

In an implementation manner, the signal estimation value information and the corresponding measurement period thereof in step 101 may be signal power (for example, Reference Signal Receiving Power, reference signal receiving power, RSRP) information and a corresponding measurement period thereof. Accordingly, the signal estimation value of the non-active component carrier in the aggregated carrier cell in step 102 may be signal power (for example, RSRP) of the non-active component carrier in the aggregated carrier cell. Optionally, the signal power information and the corresponding measurement period thereof in the measurement configuration information include a signal power range and a corresponding measurement period thereof or a signal power value and a corresponding measurement period thereof.

When the signal power information and the corresponding measurement period thereof in the above measurement configuration information are the signal power range and the corresponding measurement period thereof, the UE may select the measurement period of the non-active component carrier from the above measurement configuration information according to the signal power of the non-active component carrier in the aggregated carrier cell. The above measurement configuration information may further include type information or power information of the aggregated carrier cell, or speed information. In this case, the UE may also select the measurement period of the non-active component carrier from the measurement configuration information according to the type information or power information of the aggregated carrier cell sent from a serving base station or according to the current speed of the UE (for example, a current speed value of the UE obtained by the network by calculation or a current speed value obtained by the UE).

When the signal power information and the corresponding measurement period thereof in the above measurement configuration information are the signal power value and the corresponding measurement period thereof, the UE receives measurement period calculation information sent from the serving base station, and calculates the measurement period of the non-active component carrier according to the signal power of the non-active component carrier in the aggregated carrier cell, the measurement configuration information, and the measurement period calculation information. The above measurement configuration information may further include type information or power information of the aggregated carrier cell, or speed information. In this case, the UE firstly selects a corresponding signal power value and a corresponding measurement period thereof from the above measurement configuration information according to the type information or power information of the aggregated carrier cell sent from the serving base station or a current speed of the UE (for example, a current speed value of the UE obtained by the network by calculation or a current speed value obtained by the UE), and then obtains by calculation a measurement period of the non-active component carrier according to the measurement period calculation information, the signal power of the non-active component carrier in the aggregated carrier cell, and the selected signal power value and the corresponding measurement period thereof.

In step 102, the method for obtaining the signal power of the non-active component carrier in the aggregated carrier cell may include: The UE measures the non-active component carrier in the aggregated carrier cell, and obtains the signal power of the non-active component carrier or the UE obtains the signal power of the non-active component carrier in the aggregated carrier cell according to signal power of a known component carrier in the aggregated carrier cell. In addition, the signal power of the above non-active component carrier may also be a mean value of the signal power of the non-active component carrier.

In another implementation manner, the signal estimation value information and the corresponding measurement period thereof in step 101 may be signal quality (for example, Reference Signal Receiving Quality, reference signal receiving quality, RSRQ) information and a corresponding measurement period thereof. Accordingly, the signal estimation value of the non-active component carrier in the aggregated carrier cell in step 102 may be signal quality (for example, RSRQ) of the non-active component carrier in the aggregated carrier cell. Optionally, the signal quality information and the corresponding measurement period thereof in the above measurement configuration information include a signal quality range and a corresponding measurement period thereof or a signal quality value and a corresponding measurement period thereof.

When the signal quality information and the corresponding measurement period thereof in the above measurement configuration information are the signal quality range and the corresponding measurement period thereof, the UE may select a measurement period of the non-active component carrier from the above measurement configuration information according to the signal quality of the non-active component carrier in the aggregated carrier cell. The above measurement configuration information may further include type information or power information of the aggregated carrier cell, or speed information. In this case, the UE may also select a measurement period of the non-active component carrier from the measurement configuration information according to the type information or power information of the aggregated carrier cell sent from a serving base station or according to the current speed of the UE (for example, a current speed value of the UE obtained by the network by calculation or a current speed value obtained by the UE).

When the signal quality information and the corresponding measurement period thereof in the above measurement configuration information are a signal quality value and a corresponding measurement period thereof, the UE receives measurement period calculation information sent from the serving base station, and calculates a measurement period of the non-active component carrier according to the signal quality of the non-active component carrier in the aggregated carrier cell, the measurement configuration information, and the measurement period calculation information. The above measurement configuration information may further include type information or power information of the aggregated carrier cell, or speed information. In this case, the UE firstly selects a signal quality value and a corresponding measurement period thereof from the above measurement configuration information according to the type information or power information of the aggregated carrier cell sent from the serving base station or a current speed of the UE (for example, a current speed value of the UE obtained by the network by calculation or a current speed value obtained by the UE), and then obtains by calculation a measurement period of the non-active component carrier according to the measurement period calculation information, the signal power of the non-active component carrier in the aggregated carrier cell, and the selected signal quality value and corresponding measurement period thereof.

In step 102, the method for obtaining the signal quality of the non-active component carrier in the aggregated carrier cell may include: The UE measures the non-active component carrier in the aggregated carrier cell, and obtains the signal quality of the non-active component carrier or the UE obtains the signal quality of the non-active component carrier in the aggregated carrier cell according to signal quality of a known component carrier in the aggregated carrier cell. In addition, the signal quality of the above non-active component carrier may also be a mean value of the signal quality of the non-active component carrier.

In another implementation manner, the signal estimation value information and the corresponding measurement period thereof in step 101 may be path loss information and a corresponding measurement period thereof. Accordingly, the signal estimation value of the non-active component carrier in the aggregated carrier cell in step 102 is a path loss of the non-active component carrier in the aggregated carrier cell.

Optionally, the signal path loss information and the corresponding measurement period thereof in the above measurement configuration information include a signal path loss range and a corresponding measurement period thereof or a signal path loss value and a corresponding measurement period thereof.

When the signal path loss information and the corresponding measurement period thereof in the above measurement configuration information are the signal path loss range and the corresponding measurement period thereof, the UE may select the measurement period of the non-active component carrier from the measurement configuration information according to the signal path loss of the non-active component carrier in the aggregated carrier cell. The above measurement configuration information may further include type information or power information of the aggregated carrier cell, or speed information. In this case, the UE may also select the measurement period of the non-active component carrier from the measurement configuration information according to the type information or power information of the aggregated carrier cell sent from a serving base station or according to the current speed of the UE (for example, a current speed value of the UE obtained by the network by calculation or a current speed value obtained by the UE).

When the signal path loss information and the corresponding measurement period thereof in the above measurement configuration information are a signal path loss value and a corresponding measurement period thereof, the UE receives measurement period calculation information sent from the serving base station, and calculates a measurement period of the non-active component carrier according to the signal path loss of the non-active component carrier in the aggregated carrier cell, the measurement configuration information, and the measurement period calculation information. The above measurement configuration information may further include type information or power information of the aggregated carrier cell, or speed information. In this case, the UE firstly selects a signal path loss value and a corresponding measurement period thereof from the above measurement configuration information according to the type information or power information of the aggregated carrier cell sent from the serving base station, or a current speed of the UE (for example, a current speed value of the UE obtained by the network by calculation or a current speed value obtained by the UE), and then obtains by calculation a measurement period of the non-active component carrier according to the measurement period calculation information, the signal path loss of the non-active component carrier in the aggregated carrier cell, and the selected signal path loss value and the corresponding measurement period thereof.

In step 102, the method for obtaining the path loss of the non-active component carrier in the aggregated carrier cell may include: The UE measures the non-active component carrier in the aggregated carrier cell, and obtains the path loss of the non-active component carrier or the UE obtains the signal path loss of the non-active component carrier in the aggregated carrier cell according to a signal path loss of a known component carrier in the aggregated carrier cell. In addition, the signal path loss of the above non-active component carrier may also be a mean value of the signal path loss of the non-active component carrier.

To make those skilled in the art understand the present invention more clearly, the following describes the implementation manner of the present invention based on an example where the signal estimation value information and the corresponding measurement period thereof in the measurement configuration information are signal power information and a corresponding measurement period thereof.

In each of following embodiments, the signal power is specifically, for example, the RSRP, and the serving cell of the UE is, for example, an aggregated carrier cell under an evolved NodeB (evolved NodeB, eNB); one aggregated cell under the eNB includes three component carriers CC1, CC2, and CC3, where CC3 refers to an active component carrier (an active CC) and CC1 and CC2 refer to non-active component carriers (non-active CCs).

In the following method embodiments illustrated in FIG. 2 to FIG. 5, the RSRP information and the corresponding measurement period thereof included in the measurement configuration information are an RSRP range and a corresponding measurement period thereof.

Figure 2:
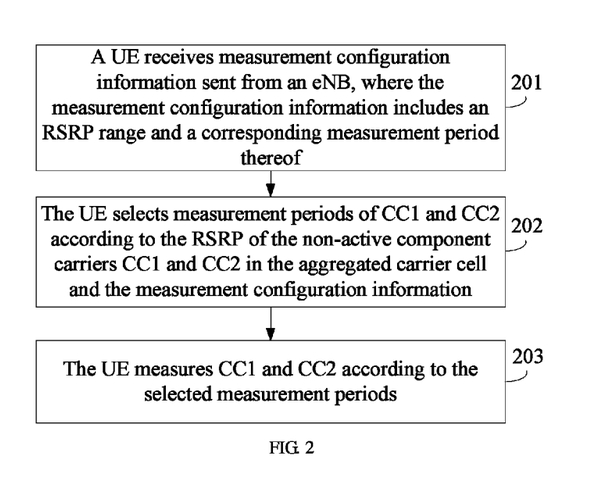
FIG. 2 is a schematic diagram of a method for measuring an aggregated carrier cell according to another embodiment of the present invention.

The embodiment of the method for measuring an aggregated carrier cell illustrated in FIG. 2 includes the following steps:

201: A UE receives measurement configuration information sent from an eNB, where the measurement configuration information includes an RSRP range and a corresponding measurement period thereof. In a specific implementation process, the eNB may send the above measurement configuration information by using a broadcast message or a radio resource control message. The measurement configuration information may be a measurement configuration table shown by Table 1. The RSRP and the corresponding measurement period thereof shown in Table 1 are only exemplary values, and may be set according to the actual network situation in the specific implementation process.

TABLE 1

| RSRP | Measurement Period |
| --- | --- |
| <−100 dBm | 10 s |
| (−100 dBm, −60 dBm) | 1 s |
| >−60 dBm | 100 ms |

TABLE 2

| RSRP | Measurement Period |
| --- | --- |
| <−100 dBm | 10 s |
| (−100 dBm, −60 dBm) | 2 s |
| >−60 dBm | 500 ms |

202: The UE selects measurement periods of CC1 and CC2 from the above measurement configuration information (shown in Table 1) according to the RSRP of the non-active component carriers CC1 and CC2 in the aggregated carrier cell.

For example, if the RSRP of CC1 and the RSRP of CC2 at T1 are both smaller than −100 dBm, the measurement periods that the UE selects for CC1 and CC2 according to Table 1 are 10 s; when the UE moves to the location at T2 and the RSRP of CC1 and CC2 is between −100 dBm and −60 dBm, the measurement periods that the UE selects for CC1 and CC2 according to Table 1 are 1 s. Or, if at T1, the RSRP of CC1 is smaller than −100 dBm and the RSRP of CC2 is between −100 dBm and −60 dBm, the measurement period that the UE selects for CC1 according to Table 1 is 10 s and the selected measurement period of CC2 is 1 s; when the UE moves to the location at T2, the RSRP of CC1 is between −100 dBm and −60 dBm and the RSRP of CC2 is greater than −60 dBm, the measurement period that the UE selects for CC1 according to Table 1 is 1 s and the selected measurement period of CC2 is 100 ms.

203: The UE measures CC1 and CC2 according to the selected measurement periods.

By using the method for measuring an aggregated carrier cell provided in this embodiment, the UE measures different component carriers in the aggregated carrier cell in different periods, which avoids power consumption due to excessive measurements. Meanwhile, non-active component carriers may be timely activated according to the RSRP.

Figure 3:
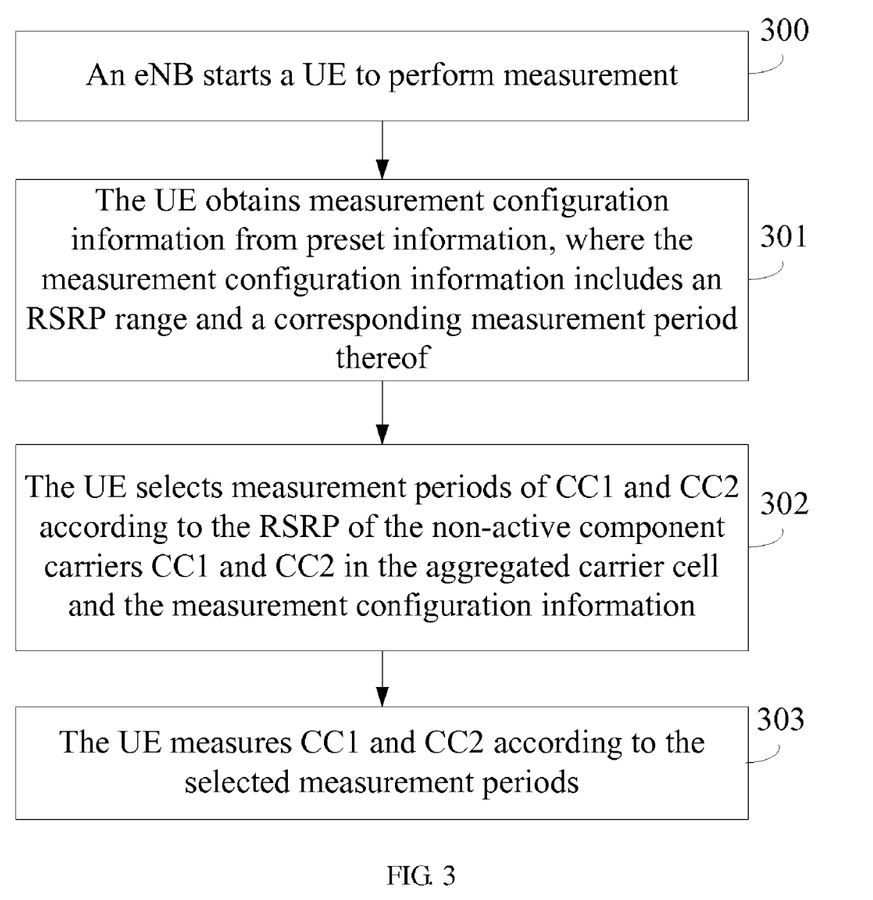
FIG. 3 is a schematic diagram of a method for measuring an aggregated carrier cell according to another embodiment of the present invention.

The embodiment of a method for measuring an aggregated carrier cell illustrated in FIG. 3 includes the following steps:

300: An eNB starts a UE to perform measurement. For example, the UE receives a measurement instruction sent from the eNB. This step is optional.

301: The UE obtains measurement configuration information from preset information, where the measurement configuration information includes an RSRP range and a corresponding measurement period thereof.

In this embodiment, the measurement configuration information may be preset by a manufacturer of the UE. For example, the information may be preset in an external storage device of the UE (for example, a user card) or in the information stored on the UE, so that the UE is capable of obtaining the measurement configuration information from the user card or from the preset information stored on the UE. Optionally, when an operator needs to update or optimize the measurement configuration table, upgrading may be performed by using UE software.

In a specific implementation process, the above measurement configuration information may be a measurement configuration table shown by Table 2. The RSRP and the corresponding measurement period thereof shown in Table 2 are only exemplary values, and may be set according to the actual network situation in the specific implementation process.

302: The UE selects measurement periods of CC1 and CC2 from the above measurement configuration information (shown in Table 2) according to the RSRP of the non-active component carriers CC1 and CC2 in the aggregated carrier cell.

For example, if the RSRP of CC1 and CC2 at T1 is smaller than −100 dBm, the measurement periods that the UE selects for CC1 and CC2 according to Table 2 are 10 s; when the UE moves to the location at T2, the RSRP of CC1 and CC2 is between −100 dBm and −60 dBm, and the measurement periods that the UE selects for CC1 and CC2 according to Table 2 are 2 s. Or, if at T1, the RSRP of CC1 is smaller than −100 dBm and the RSRP of CC2 is between −100 dBm and −60 dBm, the measurement period that the UE selects for CC1 according to Table 2 is 10 s and the selected measurement period of CC2 is 2 s; when the UE moves to the location at T2, the RSRP of CC1 is between −100 dBm and −60 dBm and the RSRP of CC2 is greater than −60 dBm, the measurement period that the UE selects for CC1 according to Table 2 is 2 s and the selected measurement period of CC2 is 500 ms.

303: The UE measures CC1 and CC2 according to the selected measurement periods.

By using the method for measuring an aggregated carrier cell provided in this embodiment, the UE measures different component carriers in the aggregated carrier cell in different periods, which avoids power consumption due to excessive measurements. Meanwhile, non-active component carriers may be timely activated according to the RSRP.

Figure 4:
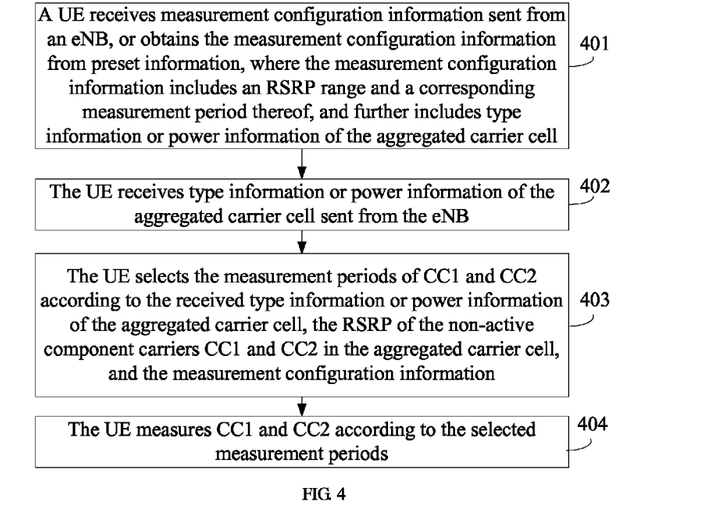
FIG. 4 is a schematic diagram of a method for measuring an aggregated carrier cell according to another embodiment of the present invention.

The embodiment of a method for measuring an aggregated carrier cell illustrated in FIG. 4 includes the following steps:

401: A UE receives measurement configuration information sent from an eNB, for example, the UE receives the measurement configuration information that the eNB sends to the UE by using a broadcast message or a radio resource control message; or the UE obtains the measurement configuration information from preset information. The above measurement configuration information includes an RSRP range and a corresponding measurement period thereof, and further includes type information or power information of the aggregated carrier cell.

The type information of the above aggregated carrier cell indicates the type of the aggregated carrier cell, for example, pico cell (Pico cell), macro cell (Macro cell), or femto cell (Femto cell). Generally, the power of a cell may also indicate the type of the cell. For example, if the cell power is 40 W, the cell is generally considered to be a Macro cell; if the cell power is 1 W, the cell is generally considered to be a Pico cell.

In a specific implementation process, the above measurement configuration information may be measurement configuration tables shown by Table 3-1 and Table 3-2 that are differentiated by the type or power of the cell or be a measurement configuration table shown by Table 4. The RSRP and corresponding measurement periods thereof shown in Table 3-1, Table 3-2, and Table 4 are only exemplary values, and may be set according to the actual network situation in the specific implementation process.

TABLE 3-1

Macro cell (or the cell transmission power is 40 W)

| RSRP | Measurement Period |
|---|---|
| <−100 dBm | 10 s |
| (−100 dBm, −60 dBm) | 1 s |
| >−60 dBm | 100 ms |

TABLE 3-2

Pico cell (or the cell transmission power is 1 W)

| RSRP | Measurement Period |
|---|---|
| <−84 dBm | 10 s |
| (−84 dBm, −44 dBm) | 1 s |
| >−44 dBm | 100 ms |

TABLE 4

| Cell Type (or Power) | RSRP | Measurement Period |
|---|---|---|
| Pico (or 1 W) | <−84 dBm | 10 s |
| Pico (or 1 W) | (−84 dBm, −44 dBm) | 1 s |
| Pico (or 1 W) | >−44 dBm | 100 ms |
| ... | ... | ... |
| Macro (or 40 W) | <−100 dBm | 10 s |
| Macro (or 40 W) | (−100 dBm, −60 dBm) | 1 s |
| Macro (or 40 W) | >−60 dBm | 100 ms |

Step 402: The UE receives type information or power information of the aggregated carrier cell sent from the eNB. In a specific implementation process, the eNB may send the type information or power information of the aggregated carrier cell to the UE by using a broadcast message or a radio resource control message.

Step 403: The UE selects the measurement periods of CC1 and CC2 according to the above received type information or power information of the aggregated carrier cell and the RSRP of the non-active component carriers CC1 and CC2 in the aggregated carrier cell, and the above measurement configuration information (as shown in Table 3-1 and Table 3-2, or Table 4).

For example, if the type information of the aggregated carrier cell that the UE receives from the eNB is Pico and the RSRP of CC1 and the RSRP of CC2 at T1 are both smaller than −84 dBm, the measurement periods that the UE selects for CC1 and CC2 according to Table 3-2 or Table 4 are 10 s; when the UE moves to the location at T2 and the RSRP of CC1 and CC2 is between −84 dBm and −44 dBm, the measurement periods that the UE selects for CC1 and CC2 according to Table 3-2 or Table 4 are 1 s. Or, if the power of the aggregated carrier cell that the UE receives from the eNB is 40 W, and at T1 the RSRP of CC1 is smaller than −100 dBm and the RSRP of CC2 is between −100 dBm and −60 dBm, so that the measurement period that the UE selects for CC1 according to Table 3-1 or Table 4 is 10 s and the selected measurement period of CC2 is 1 s; when the UE moves to the location at T2, the RSRP of CC1 is between −100 dBm and −60 dBm and the RSRP of CC2 is greater than −60 dBm, the measurement period that the UE selects for CC1 according to Table 3-1 or Table 4 is 1 s and the selected measurement period of CC2 is 100 ms.

404: The UE measures CC1 and CC2 according to the foregoing selected measurement periods.

By using the method for measuring an aggregated carrier cell provided in this embodiment, the UE measures different component carriers in the aggregated carrier cell in different periods, which avoids power consumption due to excessive measurements. Meanwhile, non-active component carriers may be timely activated according to the RSRP.

Figure 5:
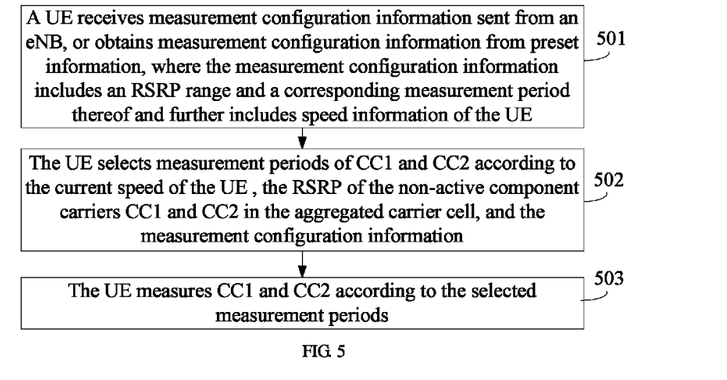
FIG. 5 is a schematic diagram of a method for measuring an aggregated carrier cell according to another embodiment of the present invention.

The embodiment of a method for measuring an aggregated carrier cell illustrated in FIG. 5 includes the following steps:

501: A UE receives measurement configuration information sent from an eNB, for example, the UE receives the measurement configuration information that the eNB sends to the UE through a broadcast message or a radio resource control message or obtains measurement configuration information from preset information, where the measurement configuration information includes an RSRP range and a corresponding measurement period thereof and further includes speed information.

In a specific implementation process, the above measurement configuration information may be measurement configuration tables shown by Table 5-1, Table 5-2, and Table 5-3 that are differentiated by the speed information of the UE or may be a measurement configuration table shown by Table 6. The RSRP and corresponding measurement periods thereof shown in Table 5-1, Table 5-2, Table 5-3, and Table 6 are only exemplary values, and may be set according to the actual network situation in the specific implementation process.

TABLE 5-1

UE speed < 5 km/h

| RSRP | Measurement Period |
|---|---|
| <−84 dBm | 20 s |
| (−84 dBm, −44 dBm) | 5 s |
| >−44 dBm | 100 ms |

TABLE 5-2

5 km/h < UE speed < 30 km/h

| RSRP | Measurement Period |
|---|---|
| <−100 dBm | 10 s |
| (−100 dBm, −60 dBm) | 2 s |
| >−60 dBm | 100 ms |

TABLE 5-3

UE speed > 30 km/h

| RSRP | Measurement Period |
|---|---|
| <−110 dBm | 5 s |
| (−110 dBm, −70 dBm) | 1 s |
| >−70 dBm | 100 ms |

TABLE 6

| UE Speed | RSRP | Measurement Period |
|---|---|---|
| <5 km/h | <−84 dBm | 20 s |
| <5 km/h | (−84 dBm, −44 dBm) | 5 s |
| <5 km/h | >−44 dBm | 100 ms |
| ... | ... | ... |
| (5 km/h, 30 km/h) | <−100 dBm | 10 s |
| (5 km/h, 30 km/h) | (−100 dBm, −60 dBm) | 2 s |
| (5 km/h, 30 km/h) | >−60 dBm | 100 ms |
| ... | ... | ... |
| >30 km/h | <−110 dBm | 5 s |
| >30 km/h | (−110 dBm, −70 dBm) | 1 s |
| >30 km/h | >−70 dBm | 100 ms |

502: The UE selects measurement periods of CC1 and CC2 according to the current speed of the UE (for example, a current speed value of the UE obtained by the network by calculation or a current speed value obtained by the UE), the RSRP of the non-active component carriers CC1 and CC2 in the aggregated carrier cell, and the above measurement configuration information (for example, Table 5-1, Table 5-2, and Table 5-3, or Table 6).

For example, if the UE in low-speed movement is at a speed smaller than 5 km/h at T1 and the RSRP of CC1 and the RSRP of CC2 are both smaller than −84 dBm, the measurement periods that the UE selects for CC1 and CC2 according to Table 5-1 or Table 6 are 20 s; when the UE moves to a location at T2, if the UE in medium-speed movement is at a speed larger than 5 km/h and smaller than 30 km/h and the RSRP of CC1 and CC2 is between −100 dBm and −70 dBm, the measurement periods that the UE selects for CC1 and CC2 according to Table 5-2 or Table 6 are 2 s. Or, at T1, if the UE in low-speed movement is at a speed smaller than 5 km/h, the RSRP of CC1 is smaller than −84 dBm and the RSRP of CC2 is between −84 dBm and −44 dBm, the measurement period that the UE selects for CC1 according to Table 5-1 or Table 6 is 20 s and the selected measurement period of CC2 is 5 s; when the UE moves to the location at T2, if the UE in high-speed movement is at a speed greater than 30 km/h, the RSRP of CC1 is between −110 dBm and −70 dBm and the RSRP of CC2 is greater than −70 dBm, the measurement period that the UE selects for CC1 according to Table 5-3 or Table 6 is 1 s and the selected measurement period of CC2 is 100 ms.

503: The UE measures CC1 and CC2 according to the selected measurement periods.

By using the method for measuring an aggregated carrier cell provided in this embodiment, the UE measures different component carriers in the aggregated carrier cell in different periods, which avoids power consumption due to excessive measurements. Meanwhile, non-active component carriers may be timely activated according to the RSRP.

The following embodiments of the method are different from the method embodiments illustrated in FIG. 2 to FIG. 5 in that: The RSRP information and the corresponding measurement period thereof included in the measurement configuration information are an RSRP value and a corresponding measurement period thereof.

Figure 6:
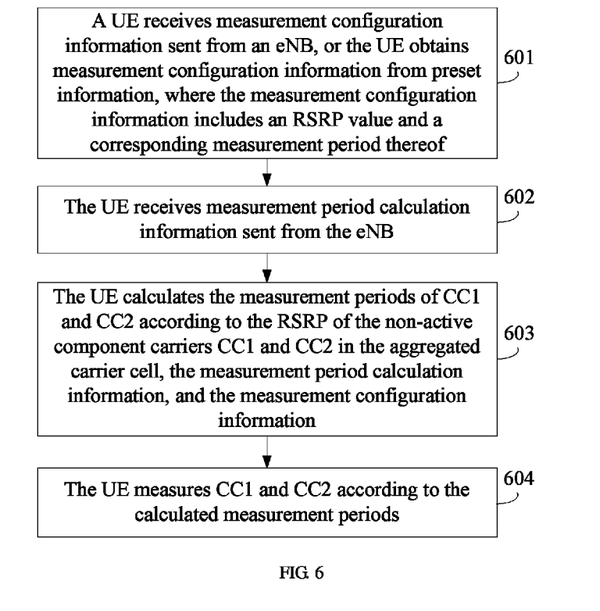
FIG. 6 is a schematic diagram of a method for measuring an aggregated carrier cell according to another embodiment of the present invention.

As shown in FIG. 6, a method for measuring an aggregated carrier cell provided in an embodiment includes the following steps:

601: A UE receives measurement configuration information sent from an eNB, or obtains measurement configuration information from preset information, where the measurement configuration information includes an RSRP value and a corresponding measurement period thereof.

In a specific implementation process, the eNB may send the above measurement configuration information through a broadcast message or a radio resource control message; or the above measurement configuration information may be preset by a manufacturer of the UE, for example, the information is preset in an external storage device of the UE (for example, a user card) or preset in information stored on the UE. The UE may obtain the above measurement configuration information from the user card or the preset information stored on the UE. Optionally, when an operator needs to update or optimize the measurement configuration table, upgrading may be performed by using UE software.

The above measurement configuration information may be a measurement configuration table shown by Table 7. The RSRP value and the corresponding measurement period thereof shown in Table 7 are only exemplary values, and may be set according to the actual network situation in the specific implementation process.

TABLE 7

| RSRP | Measurement Period |
|---|---|
| −70 dBm | 10 s |
| −44 dBm | 100 ms |

Optionally, Table 7 may further include a measurement period upper limit value (for example, 20 s) and a corresponding minimum RSRP threshold, a measurement period lower limit value (for example, 10 ms) and a corresponding maximum RSRP threshold. When the RSRP of CC1 or CC2 is smaller than the minimum RSRP threshold, the measurement period upper limit value is used in the measurement; when the RSRP of CC1 or CC2 is greater than the maximum RSRP threshold, the measurement period lower limit value is used in the measurement.

602: The UE receives measurement period calculation information sent from the eNB.

603: The UE calculates the measurement periods of CC1 and CC2 according to the RSRP of the non-active component carriers CC1 and CC2 in the aggregated carrier cell, the measurement period calculation information, and the measurement configuration information (as shown in Table 7).

Figure 6A:
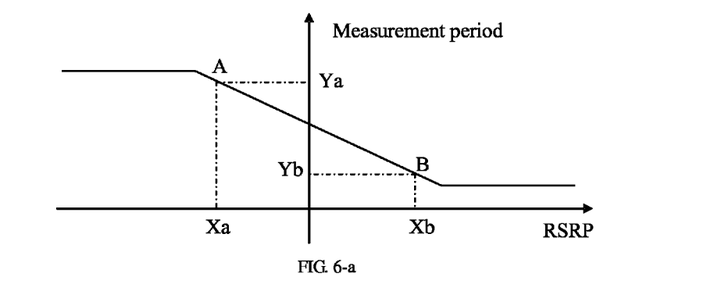

For example, when the measurement period calculation information is a linear difference calculation rule, according to Table 7 and the linear relationship shown in FIG. 6-a, the RSRP of a point A is Xa32−70 dBm and the corresponding measurement period is Ya=10 s; the RSRP of a point B is Xb32−44 dBm and the corresponding measurement period is Yb=100 ms; the RSRP of CC1 is Xcc1, and the RSRP of CC2 is Xcc2. The measurement period of CC1 may be calculated as follows according to the linear relationship:

$$Ycc1 = Yb - (Yb - Ya)*(Xcc1 - Xa)/(Xb - Xa);$$

The measurement period of the CC2 is as follows:

$$Ycc2 = Yb - (Yb - Ya)*(Xcc2 - Xa)/(Xb - Xa).$$

Figure 6B:
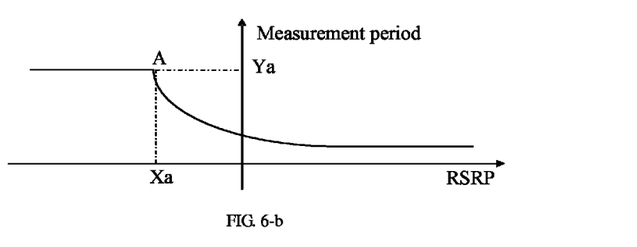

In another example, when the measurement period calculation information that the eNB sends to the UE is a non-linear (for example, a parabolic curve) calculation rule shown in FIG. 6-b and a measurement period calculation parameter γ (for example, −0.1), according to above Table 7 and FIG. 6-b, the RSRP of a point A is Xa32−70 dBm and the corresponding measurement period is Ya=10 s; the RSRP of CC1 is Xcc1, and the RSRP of CC2 is Xcc2. The measurement periods Ycc1 and Ycc2 of CC1 and CC2 may be calculated according to the following formulas:

$$(Xcc1 - Xa) = \gamma(Ycc1 - Ya)^2;$$

$$(Xcc2 - Xa) = \gamma(Ycc2 - Ya)^2.$$

Besides the measurement period calculation information and the corresponding calculation methods in the above two examples, those skilled in the art may also calculate the measurement periods of CC1 and CC2 by using other calculation methods, for example, by using the cubit difference. In addition, in this embodiment, multiple ranges may be divided according to multiple RSRP values, the measurement period may be calculated in each range according to the measurement period calculation information.

604: The UE measures CC1 and CC2 according to the calculated measurement periods.

By using the method for measuring an aggregated carrier cell provided in this embodiment, the UE measures different component carriers in the aggregated carrier cell in different periods, which avoids power consumption due to excessive measurements. Meanwhile, non-active component carriers may be timely activated according to the RSRP.

Figure 7:
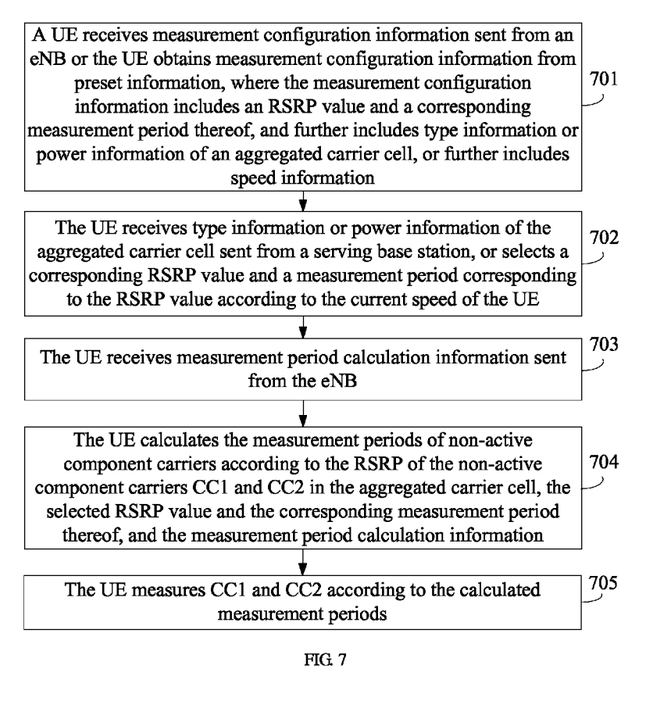
FIG. 7 is a schematic diagram of a method for measuring an aggregated carrier cell according to another embodiment of the present invention.

As shown in FIG. 7, a method for measuring an aggregated carrier cell provided in an embodiment includes the following steps:

701: A UE receives measurement configuration information sent from an eNB or the UE obtains measurement configuration information from preset information, where the measurement configuration information includes an RSRP value and a corresponding measurement period thereof, and further includes type information or power information of an aggregated carrier cell, or further includes speed information.

In a specific implementation process, the eNB may send the above measurement configuration information through a broadcast message or a radio resource control message; or the above measurement configuration information may be preset by a manufacturer of the UE, for example, preset in an external storage device of the UE (for example, a user card) or preset in information stored by the UE. The UE may obtain the measurement configuration information from the user card or the preset information stored by the UE. Optionally, when an operator needs to update or optimize the measurement configuration table, upgrading may be performed by using UE software.

The above measurement configuration information that includes the type information or power information of the aggregated carrier cell may be measurement configuration tables shown by Table 8-1 and Table 8-2 or a measurement configuration table shown by Table 9. The above measurement configuration information including the speed information may be measurement configuration tables shown by Table 10-1, Table 10-2, and Table 10-3 or a measurement configuration table shown by Table 11. The RSRP values and corresponding measurement periods thereof shown in Table 8-1, Table 8-2, Table 9, Table 10-1, Table 10-2, Table 10-3, and Table 11 are only exemplary values, and may be set according to the actual network situation in the specific implementation process.

TABLE 8-1

Macro cell (or the cell transmission power is 40 W)

| RSRP | Measurement Period |
|---|---|
| −100 dBm | 10 s |
| −60 dBm | 100 ms |

TABLE 8-2

Pico cell (or the cell transmission power is 1 W)

| RSRP | Measurement Period |
|---|---|
| −84 dBm | 10 s |
| −44 dBm | 100 ms |

TABLE 9

| Cell Type (or Power) | RSRP | Measurement Period |
|---|---|---|
| Pico (or 1 W) | −84 dBm | 10 s |
| Pico (or 1 W) | −44 dBm | 100 ms |
| ... | ... | ... |
| Macro (or 40 W) | −100 dBm | 10 s |
| Macro (or 40 W) | −60 dBm | 100 ms |

TABLE 10-1

UE speed < 5 km/h

| RSRP | Measurement Period |
|---|---|
| −70 dBm | 10 s |
| −44 dBm | 100 ms |

TABLE 10-2

5 km/h < UE speed < 30 km/h

| RSRP | Measurement Period |
|---|---|
| −90 dBm | 10 s |
| −60 dBm | 100 ms |

TABLE 10-3

UE speed > 30 km/h

| RSRP | Measurement Period |
|---|---|
| −110 dBm | 10 s |
| −80 dBm | 100 ms |

TABLE 11

| UE Speed | RSRP | Measurement Period |
|---|---|---|
| <5 km/h | −70 dBm | 10 s |
| <5 km/h | −44 dBm | 100 ms |
| ... | ... | ... |
| (5 km/h, 30 km/h) | −90 dBm | 10 s |
| (5 km/h, 30 km/h) | −60 dBm | 100 ms |
| ... | ... | ... |
| >30 km/h | −110 dBm | 10 s |
| >30 km/h | −80 dBm | 100 ms |

Optionally, Table 8-1, Table 8-2, Table 9, Table 10-1, Table 10-2, Table 10-3, and Table 11 may further include a measurement period upper limit value (for example, 20 s) and a corresponding minimum RSRP threshold, a measurement period lower limit value (for example, 10 ms) and a corresponding maximum RSRP threshold. When the RSRP of CC1 or CC2 is smaller than the minimum RSRP threshold, the measurement period upper limit value is used in the measurement; when the RSRP of CC1 or CC2 is greater than the maximum RSRP threshold, the measurement period lower limit value is used in the measurement.

702: The UE receives type information or power information of the aggregated carrier cell sent from a serving base station, or selects a corresponding RSRP value and a measurement period corresponding to the RSRP value according to the current speed of the UE (for example, a current speed value obtained by the network by calculation or current speed value obtained by the UE).

For example, if the type information of the aggregated carrier cell that the UE receives from the eNB is Macro cell or the power information is 40 W, the UE selects the RSRP value and the corresponding measurement period thereof shown in Table 8-1, or selects the RSRP value and the corresponding measurement period thereof that correspond to the Macro cell or power information of 40 W. If the current speed of the UE is 20 km/h, the UE selects the RSRP value and the corresponding measurement period thereof shown in Table 10-2, or selects the RSRP value and the corresponding measurement period thereof corresponding to (5 km/h, 30 km/h) and shown in Table 11.

703: The UE receives measurement period calculation information sent from the eNB. 703 and 702 may be performed in any sequence.

704: The UE calculates the measurement periods of the non-active component carriers CC1 and CC2 according to the RSRP of the non-active component carriers CC1 and CC2 in the aggregated carrier cell, the above selected RSRP value and the corresponding measurement period thereof, and the above measurement period calculation information. The specific calculation method may be referred to the specific content in 603 in the above embodiment, and is not further described.

705: The UE measures CC1 and CC2 according to the foregoing calculated measurement periods.

By using the method for measuring an aggregated carrier cell provided in this embodiment, the UE measures different component carriers in the aggregated carrier cell in different periods, which avoids power consumption due to excessive measurements. Meanwhile, non-active component carriers may be timely activated according to the RSRP.

In the above embodiment, the method for obtaining the RSRP of the non-active component carriers CC1 and CC2 may include: measuring the non-active component carriers CC1 and CC2 in the aggregated carrier cell, and obtaining the RSRP of CC1 and CC2; or calculating the RSRP of the above non-active component carriers according to the RSRP of a known active component carrier or non-active component carrier. For example, the RSRP of the non-active component carriers CC1 and CC2 are calculated according to the RSRP of the active component carrier; or the RSRP of the non-active component carrier CC1 is given, and the RSRP of CC2 is calculated according to the RSRP of CC1. For example, if the RSRP of CC2 and the RSRP of CC1 that the UE at a geographic location at T1 calculates according to the RSRP of CC3 are both smaller than −100 dBm, the measurement periods that the UE selects for CC1 and CC2 are 10 s according to Table 1. If the RSRP of CC2 that the UE at a geographic location at T2 calculates according to the RSRP of CC3 is between −60 dBm and −100 dBm and the RSRP of CC1 is smaller than −100 dBm, according to Table 1, the measurement period that the UE selects for CC1 is 1 s and the measurement period of CC1 is 10 s.

Specifically, the principle for calculating the RSRP of other CCs in the aggregated carrier cell according to the known RSRP of a CC is as follows: the transmit power of CC1, CC2, and CC3 is different, and RSRP is attenuated in concentric circles going outwards, which results in different RSRP of CC1, CC2, and CC3 reaching the UE, but a difference exists between the CCs. Therefore, the RSRP of other CCs may be obtained by calculation according to the RSRP of the known CC and the difference. Specifically, in the case where each component carrier is located at a same frequency band, the difference between the RSRP of the component carriers is statistically fixed. Therefore, the RSRP of other component carriers can be calculated according to the RSRP of the known component carrier and the fixed difference. In the case where the component carriers are located at different frequency bands, although the difference between the RSRP of the component carrier is not statistically fixed, calculation may also be performed. For example, The UE reports the actually measured RSRP, the network (for example, the eNB) forms an actual difference between the RSRP of CCs according to the data reported constantly by the UE, and then the network sends the actual difference to the UE, so that the UE is capable of calculating the RSRP of other CCs according to the RSRP of the known CC and the actual difference; or a fixed difference between CCs may be configured during system configuration, for example, a difference between difference CCs in the aggregated carrier cell is set according to the actually measured data during the system configuration, so that the UE is capable of calculating the RSRP of other CCs according to the RSRP of the known CC and the difference configured in the system. In the manner of calculating the RSRP of non-active component carriers by using the known component carrier, the following configuration information may be configured: when the RSRP value of a non-active component carrier is smaller than a threshold, the measurement period of the non-active component carrier is +∞, that is, no measurement is performed.

The above embodiments of the method shown in FIG. 2 to FIG. 7 are described based on only the fact that the signal estimation value information in the measurement configuration information is the RSRP information. When the signal estimation value information in the measurement configuration information is signal quality information (for example, RSRQ) or signal path loss information, the implementation manner is similar to the above embodiments, for example, the signal power shown in Table 1 to Table 11 may be replaced with the signal quality (for example, RSRQ) or the signal path loss, and the values and measurement periods may also be replaced accordingly. Details are not further described.

Figure 8:
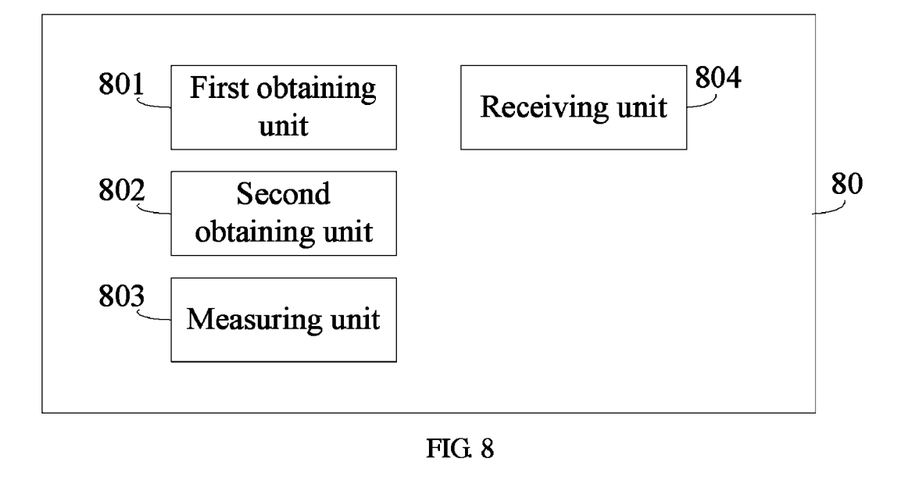
FIG. 8 is a schematic structural diagram of a user equipment according to an embodiment of the present invention.

An embodiment of the present invention provides a user equipment 80, which, as shown in FIG. 8, includes: a first obtaining unit 801, a second obtaining unit 802, and a measuring unit 803. The first obtaining unit 801 obtains measurement configuration information of an aggregated carrier cell, where the measurement configuration information includes signal estimation value information and a corresponding measurement period thereof. The second obtaining unit 802 obtains a measurement period of a non-active component carrier according to a signal estimation value of the non-active component carrier in the aggregated carrier cell and the measurement configuration information. The measuring unit 803 measures the non-active component carrier according to the above measurement period.

The above first obtaining unit 801 is further configured to receive the above measurement configuration information sent from a serving base station, or obtain the measurement configuration information from preset information of the user equipment 80.

Further, the signal estimation value information and the corresponding measurement period thereof in the measurement configuration information obtained by the first obtaining unit 801 includes a signal estimation value range and a corresponding measurement period thereof. The second obtaining unit 802 is further configured to select a measurement period of the non-active component carrier from the above measurement configuration information according to a signal estimation value of the non-active component carrier in the aggregated carrier cell. If the measurement configuration information obtained by the first obtaining unit 801 further includes type information or power information of the aggregated carrier cell, the second obtaining unit 802 selects the measurement period of the non-active component carrier from the above measurement configuration information according to the type information or power information of the aggregated carrier cell received from a serving base station and the signal estimation value of the non-active component carrier in the aggregated carrier cell. If the measurement configuration information obtained by the first obtaining unit further includes speed information, the second obtaining unit 802 selects a measurement period of the non-active component carrier according to a current speed of the user equipment 80 (for example, a current speed value of the UE obtained by the network by calculation or a current speed value obtained by the UE) and the signal estimation value of the non-active component carrier in the aggregated carrier cell.

Further, the signal estimation value information and the corresponding measurement period thereof in the measurement configuration information obtained by the first obtaining unit 801 includes a signal estimation value and a corresponding measurement period thereof. The user equipment 80 further includes a receiving unit 804 configured to receive measurement period calculation information sent from a serving base station. The second obtaining unit 802 obtains by calculation a measurement period of the non-active component carrier according to the signal estimation value of the non-active component carrier in the aggregated carrier cell, the signal estimation value and the corresponding measurement period thereof, and the measurement period calculation information received by the receiving unit 804. If the measurement configuration information obtained by the first obtaining unit 801 further includes type information or power information of the aggregated carrier cell, the second obtaining unit 802 selects a signal estimation value and a corresponding measurement period thereof from the above measurement configuration information according to the type information or power information of the aggregated carrier cell received from the serving base station, and obtains by calculation a measurement period of the non-active component carrier according to the signal estimation value of the non-active component carrier in the aggregated carrier cell, the selected signal estimation value and the corresponding measurement period thereof, and the measurement period calculation information received by the receiving unit 804. If the measurement configuration information obtained by the first obtaining unit 801 further includes speed information, the second obtaining unit 802 selects a signal estimation value and a corresponding measurement period thereof from the measurement configuration information according to the current speed of the user equipment (for example, a current speed value of the UE obtained by the network by calculation or a current speed value obtained by the UE), and obtains by calculation the measurement period of the non-active component carrier according to the signal estimation value of the non-active component carrier in the aggregated carrier cell, the selected signal estimation value and the corresponding measurement period thereof, and the measurement period calculation information received by the receiving unit 804.

In a specific implementation process, the above signal estimation value information and the corresponding measurement period thereof may be signal power (for example, RSRP) information and a corresponding measurement period thereof. Accordingly, the signal estimation value of the non-active component carrier in the aggregated carrier cell is signal power (for example, RSRP) of the non-active component carrier in the aggregated carrier cell; or the signal estimation value information and the corresponding measurement period thereof may also be signal quality information and a corresponding measurement period thereof. Accordingly, the signal estimation value of the non-active component carrier in the aggregated carrier cell is signal quality of the non-active component carrier in the aggregated carrier cell; or the signal estimation value information and the corresponding measurement period thereof may also be signal path loss information and a corresponding measurement period thereof. Accordingly, the signal estimation value of the non-active component carrier in the aggregated carrier cell is a signal path loss of the non-active component carrier in the aggregated carrier cell.

The second obtaining unit 802 is further configured to: measure a non-active component carrier in the aggregated carrier cell, and obtain a signal estimation value of the non-active component carrier or obtain a signal estimation value of the non-active component carrier in the aggregated carrier cell according to the signal estimation value of a known component carrier in the aggregated carrier cell. Optionally, the signal estimation value of the non-active component carrier may be a mean value of the signal estimation value of the non-active component carrier.

Figure 9:
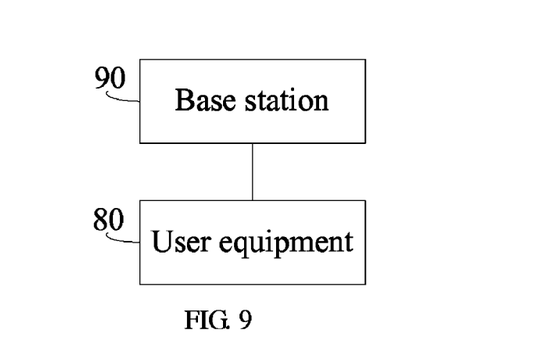
FIG. 9 is a schematic structural diagram of a system for measuring an aggregated carrier cell according to an embodiment of the present invention.

As shown in FIG. 9, an embodiment of the present invention further provides a system for measuring an aggregated carrier cell, including a base station 90 and the user equipment 80 shown in FIG. 8.

To make the description easy and neat, specific working procedures of the system and user equipment provided in this embodiment may be referred to corresponding processes in the methods provided in the foregoing embodiments, and are not further described.

By using the user equipment and the system for measuring an aggregated carrier cell provided in this embodiment, the UE measures different component carriers in the aggregated carrier cell in different periods, which avoids power consumption due to excessive measurements. Meanwhile, non-active component carriers may be timely activated according to the signal estimation value.

In several embodiments of the present invention, the system, apparatus, and method of the present invention may be implemented through other modes. For example, the above apparatus is only for illustration. For example, the division of the unit is only performed according to the logical function. In the actual implementation, other division modes may be available, for example, multiple units or components may be combined or integrated in a system, or some features may be ignored or not be executed.

In addition, each of the function units in embodiments of the present invention may be integrated into a processing unit, or exists independently, or two ore more units are integrated into a unit. The integrated unit may be embodied in the form of hardware or a software function unit.

If the integrated unit is embodied in the form of a software function unit and is sold or used as a separate product, the integrated unit may be stored in a computer readable storage medium. Based on such understanding, the essence of the technical solution under the present invention or the contributions to the prior art may be embodied as a software product. The software product is stored in a storage medium, and includes several instructions that enable a computer device (a PC, a server or a network device) to perform all or part of the steps of the methods provided in the embodiments of the present invention. The storage medium includes various media capable of storing program code, such as a U disk, a portable hard disk, a read-only memory (ROM, Read-Only Memory), a random access memory (RAM, Random Access Memory), a magnetic disk, or a compact disc-read only memory.

The above descriptions are merely exemplary embodiments of the present invention, but not intended to limit the scope of the present invention. Any modification, equivalent replacement, or improvement made without departing from the principle of the present invention should fall within the scope of the present invention. Therefore, the scope of the present invention is subject to the appended claims.

What is claimed is:

1. A non-transitory computer readable medium, comprising:
   a computer program code comprising one or more executable instructions, which, when executed by a user equipment, cause the user equipment to perform a method for measuring an aggregated carrier cell configured with multiple component carriers, wherein the method comprises:
   receiving a measurement period parameter for component carrier measurement period calculation from a base station;
   determining a measurement period for a non-active component carrier among the multiple component carriers in accordance with the received measurement period parameter and a signal estimation value of the non-active component carrier;
   performing measurement on the non-active component carrier according to the determined measurement period for the non-active component carrier.

2. The non-transitory computer readable medium of claim 1, wherein the measurement period for the non-active component carrier is infinite in a case that the signal estimation value of the non-activate component carrier is smaller than a pre-configured threshold.

3. The non-transitory computer readable medium of claim 2, wherein the measurement on the non-active component carrier comprises reference signal receiving power (RSRP) measurement on the non-active component carrier.

4. The non-transitory computer readable medium of claim 2, wherein the measurement on the non-active component carrier comprises reference signal receiving quality (RSRQ) measurement on the non-active component carrier.

5. The non-transitory computer readable medium of claim 1, wherein the measurement period parameter is received through a radio resource control message from the base station.

6. The non-transitory computer readable medium of claim 1, wherein the signal estimation value of the non-active component carrier comprises a signal power of the non-active component carrier.

7. The non-transitory computer readable medium of claim 6, wherein the signal power of the non-active component carrier comprises a reference signal receiving power of the non-active component carrier.

8. The non-transitory computer readable medium of claim 1, wherein the signal estimation value of the non-active component carrier comprises signal quality of the non-active component carrier.

9. The non-transitory computer readable medium of claim 8, wherein the signal quality of the non-active component carrier comprises a reference signal receiving quality of the non-active component carrier.

10. An apparatus comprising:
    a processor and a non-transitory storage medium including one or more executable instructions,
    wherein the executable instructions, when executed by the processor, cause the processor to:
    receive a measurement period parameter for component carrier measurement period calculation from a base station;
    determine a measurement period for a non-active component carrier among multiple component carriers of an aggregated carrier cell in accordance with the received measurement period parameter and a signal estimation value of the non-active component carrier;
    perform measurement on the non-active component carrier according to the determined measurement period for the non-active component carrier.

11. The apparatus of claim 10, wherein the measurement period for the non-active component carrier is infinite in a case that the signal estimation value of the non-activate component carrier is smaller than a pre-configured threshold.

12. The apparatus of claim 11, wherein the measurement on the non-active component carrier comprises reference signal receiving power (RSRP) measurement on the non-active component carrier.

13. The apparatus of claim 11, wherein the measurement on the non-active component carrier comprises reference signal receiving quality (RSRQ) measurement on the non-active component carrier.

14. The apparatus of claim 11, wherein the apparatus comprises a user equipment.

15. The apparatus of claim 10, wherein the measurement period parameter is received through a radio resource control message from the base station.

16. The apparatus of claim 10, wherein the signal estimation value of the non-active component carrier comprises a signal power of the non-active component carrier.

17. The apparatus of claim 16, wherein the signal power of the non-active component carrier comprises a reference signal receiving power of the non-active component carrier.

18. The apparatus of claim 10, wherein the signal estimation value of the non-active component carrier comprises signal quality of the non-active component carrier.

19. The apparatus of claim 18, wherein the signal quality of the non-active component carrier comprises a reference signal receiving quality of the non-active component carrier.

20. The apparatus of claim 10, wherein the apparatus comprises a user equipment.

* * * * *